Dec. 1, 1925.  1,563,779
J. A. NORDIN
APPARATUS FOR MANUFACTURING LIGATURES AND THE LIKE
Filed Oct. 18, 1923
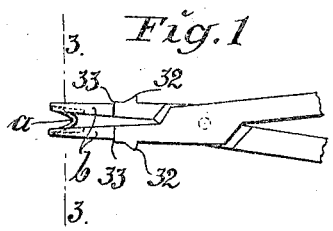
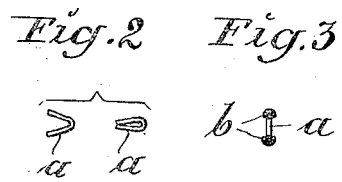
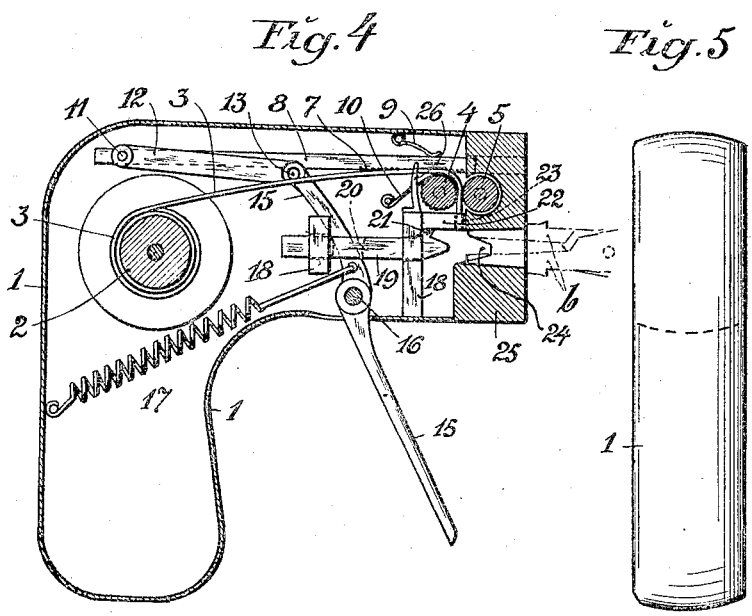
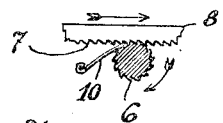
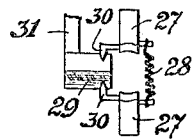
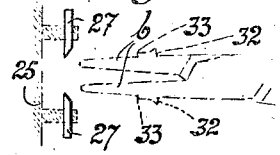
Inventor
J. A. Nordin
By Marks & Clerk Attys.

Patented Dec. 1, 1925.

1,563,779

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

APPARATUS FOR MANUFACTURING LIGATURES AND THE LIKE.

Application filed October 18, 1923. Serial No. 669,395.

*To all whom it may concern:*

Be it known that I, JOSEF AUGUST NORDIN, a subject of the King of Sweden, and resident of Gotgatan 14, Stockholm, in the Kingdom of Sweden, have invented certain new and useful Improvements in Apparatus for Manufacturing Ligatures and the like, of which the following is a specification.

This invention relates to an apparatus for automatic manufacturing of ligatures and the like. Hitherto the manufacturing of ligatures has been effected manually, which, however, is combined with comparatively great difficulties. Besides, the said method involves a great loss of time, owing to the fact that the surgeon or his assistant is not able always to insert the ligature into the tongs sufficiently rapidly. The said disadvantages are removed by the apparatus constructed in accordance with the present invention, which is characterized chiefly by a device for feeding the wire from a reel or like, a device for cutting the said wire into pieces forming the cut off piece into a ligature and putting the latter into the space between the jaws of the tongs, and a member for actuating the said devices.

A form of the invention is illustrated as an example in the accompanying drawing. Fig. 1 is a side view of the jaws of a tongs adapted for the applying of the ligature. Fig. 2 shows in a side view the shape of the ligature prior to and after the applying of same, Fig. 3 is a section on the line 3—3 in Fig. 1. Figs. 4 and 5 are a longitudinal section and an end view respectively of the apparatus, Fig. 6 shows a detail. Figs. 7 and 8 show diagrammatically a device, combined, if wanted, with the apparatus for locking the tongs to the same.

Figs. 1–3 illustrate the manner, in which the angular piece $a$, cut from the wire and constituting the ligature is put into the space between the jaws $b$ of the tongs. The said jaws are provided with grooves receiving the ligature $a$, so that the latter is guided by the edges of the said grooves, as the jaws are forced toward each other. The closed ligature has substantially the shape shown at the right hand side of Fig. 2. The bending of the wire end into the angular shape, cutting the angular part from the wire and putting the ligature thus gained into the tongs are operations, which, as stated above, involve difficulties. The said difficulties are removed by using the apparatus shown in Figs. 4 and 5.

The said apparatus consists of a casing 1, preferably shaped like a pistol, as shown, so that it can easily be managed in substantially the same manner as an automatic pistol. A reel 2, on which the ligature wire 3 is wound, is journalled in the casing 1. The wire 3 passes from the reel 2 over a fluted feed roller 4, with which a counter roller 5 co-operates. The said rollers 4 and 5 are located near the free end of the casing. The one end of the roller 4 is shaped like a ratchet wheel as shown at 6, which is engaged by a bar 8 provided with oblique teeth 7, see also Fig. 6. The said bar 8, which is adapted to reciprocate, is yieldingly forced against the wheel 6 by a plate spring 9. A pawl 10, preferably consisting of a plate spring engages the teeth of the wheel 6 and permits the same to rotate only in one direction. As the bar 8 is moved toward the right, the wheel 6 and the roller 4 are rotated in the direction indicated by the arrow in Fig. 6, while during the motion of the bar 8 in the opposite direction the teeth 7 of the same will only slide on the teeth of the wheel 6 without rotating the wheel.

A link 12 is pivoted to the bar 8 at 11, the other end of the said link being pivoted at 13 to one of the arms of a two-armed lever 15, which is pivoted at 16. The other arm of the said lever 15 extends outside the casing 1 and is adapted to be actuated manually. A coil-spring 17 tends to keep the lever 15 in the position shown in Fig. 4.

Inside the casing 1 guides 18 are provided for a slide 19, movable substantially parallel to the bar 8. The said slide 19 is reciprocated by the lever 15, extending through an aperture 20 provided in the slide. The fore end of the slide is substantially chisel shaped and provided with a dent 21, constituting a cutting member having its edge pointing forwards. The said dent 21 bears against the lower side of a transversal bar 22 fixed in the casing, below the rollers 4 and 5, and provided with a hole 23, through which the wire 3 passes. The chisel-shaped end of the slide 19 is adapted to enter into recesses 24, provided in the sides of an opening in the end wall 25 of the casing 1. The jaws $b$ of the tongs shown in Figs. 1 and 3 may be put into the said opening, as shown by dotted lines in Fig. 4, for receiving the ligature made by the apparatus.

For the manufacturing of a ligature and the placing of same into the tongs the apparatus is held by the one hand in the same manner as an automatic pistol, while the jaws of the tongs held by the other hand are located in the opening of the end wall 25. The lever 15 is then actuated in the same manner as the trigger of the pistol. The bar 8 is thus advanced and rotates the rollers 4 and 5, so that they feed the wire forwards from the reel 3 and the end of the wire extends through the hole 23 and is located in the path of the slide 19. The latter is advanced simultaneously, so that the chisel-shaped end of the same strikes the end of the wire and bends the same into an angular shape and introduces the wire end thus shaped into the space between the jaws $b$ of the tongs. Substantially simultaneously with the said operations the edge of the dent 21 cuts off the wire, so that the tongs together with a ligature held by the jaws of the same may then be withdrawn from the apparatus. The lever 15, when released, is swung backwards to its starting position by the spring 17 and returns the bar 8 and the slide 19. During the return movement of the bar 8 rollers 4 and 5 are at a standstill, so that the wire 3 is not retracted. The wire, while fed forwards, is guided by a support 26, located near the roller 4 and provided with a hole through which the wire passes.

As the slide 19 pushes the wire into the space between the jaws of the tongs, the latter is actuated by a force, which tends to move the jaws outwards in the apparatus, which may involve an unsatisfactory result, if the person, managing the apparatus, does not pay attention to the said displacing of the tongs and does not firmly hold the tongs in its inner-most position. Owing to this fact an automatically operating locking device for the tongs is preferably combined with the apparatus.

In the locking device shown in Figs 7 and 8 two jaws 27 and 27 are slidable in guides provided on the end wall 25 of the casing 1 and adapted to engage projections 32 provided on the jaws of the tongs. A spring 28 fixed to the jaws tend to move the same towards each other, so that the jaws 27 engage the projections 32, as the tongs are inserted into the opening of the end wall 25, and lock the tongs. A wedge-shaped projection 29 is provided on a movable bar 31 or any other suitable member in the casing 1. As the wire has been fed forwards and the ligature cut from the same has been inserted into the tongs in the manner described above, the said bar 31 is actuated by the bar 8, the wedge-shaped projection 29 being thereby forced into the space between two abutments 30 and 30, provided on the jaws 27 respectively, and thus moving the jaws from one another against the action of the spring 28. In this manner the tongs $b$ is released.

The disengaging of the jaws 27 may, evidently, be effected manually by actuating the bar 31, etc., by means of a finger. The jaws of the tongs are provided with shoulders 33, determining the distance for which the tongs may be inserted into the opening in the end wall of the casing 1.

Preferably, one of the side walls of the casing 1 is detachable in order to render the members of the apparatus accessible and for the change of reels.

The invention may, evidently, be modified in many respects without exceeding the limits of the invention.

By means of the described apparatus the tongs may be provided with a fresh ligature in a very simple manner and rapidly. Besides the advantage is gained that the ligature will never come into contact with the fingers of the surgeon or his assistant.

I claim:

1. An apparatus for the automatic manufacturing of ligatures comprising in combination a casing, a device for feeding the wire from a reel, a combined cutting and shaping device comprising a slide movable in a direction transverse to the path of the wire and having a chisel-shaped end, tong jaws, said casing having an opening adapted to receive the jaws of the tongs, a dent on said slide, a stationary edge co-operating with said dent whereby during the forward movement of the slide the end piece of the wire fed forward is cut off and at the same time bent and forced into the jaws, and a manually operable member actuating said device.

2. An apparatus as claimed in claim 1 characterized in that the feeding device includes two co-operating rollers, a ratchet wheel on one of said rollers, a pawl and a bar engaging the ratchet wheel, said bar having oblique teeth whereby said roller is rotated in one direction during reciprocating movement imparted to the bar.

3. An apparatus as claimed in claim 1 characterized in that the feeding device includes two co-operating rollers, a ratchet wheel associated with one of said rollers, a bar having oblique teeth engaging the ratchet wheel, means yieldably retaining the teeth on said bar in engagement with the ratchet wheel whereby said teeth may slide on the ratchet wheel during the return movement of the bar.

4. An apparatus as claimed in claim 1 characterized by the provision of a feeding device including two co-operating rollers, a ratchet wheel on one of said rollers, a bar, oblique teeth on said bar engaging said ratchet wheel, a two armed lever, a spring acting on said lever, one arm of said lever being manually operated for actuating the bar and the slide, and the other arm on said lever being connected to said spring, said lever movable manually against the action of said spring.

5. An apparatus as claimed in claim 1 characterized by the provision of a locking device including spring actuated members adapted to co-operate with projections of the jaws of the tongs whereby to prevent unintentional withdrawal of the tongs from the apparatus.

6. An apparatus as claimed in claim 1 characterized by the provision of spring actuated engaging members adapted to co-operate with the jaws of the tongs and springs for automatically disengaging said members as the ligature is introduced into the jaws of the tong.

In testimony whereof, I have signed my name to this specification.

JOSEF AUGUST NORDIN.